Sept. 8, 1942.  R. L. LLEWELLYN  2,295,042
FISH PLUG
Filed Aug. 25, 1941
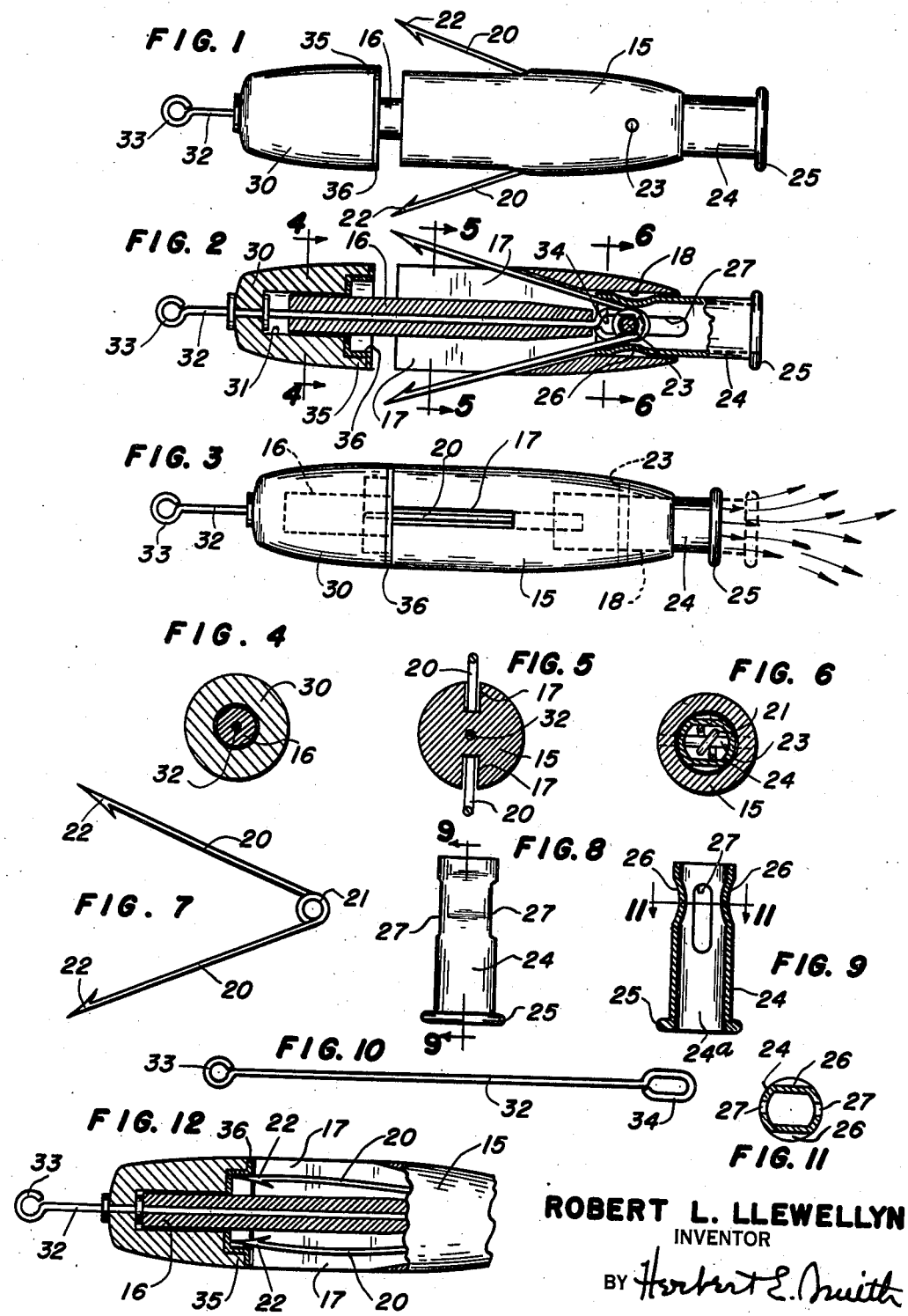
ROBERT L. LLEWELLYN
INVENTOR
BY Herbert E. Smith
ATTORNEY Patented Sept. 8, 1942

2,295,042

UNITED STATES PATENT OFFICE 2,295,042

FISH PLUG

Robert L. Llewellyn, Cheney, Wash.

Application August 25, 1941, Serial No. 408,161

4 Claims. (Cl. 43—34)

My present invention relates to improvements in a fish plug particularly designed for use in the sport of fishing, wherein the game fish is lured to an object and engaged by the hook carried thereby.

An important object of this invention is the provision of a fishing plug that is easy to make and simple to maintain in use and which has barbed prongs or engaging members which may be concealed within the plug, but which will be released when the plug is "struck" by a fish.

Another object of the invention is the provision of improved means for retracting barbed members that are adapted to be concealed within a plug body in setting the lure preparatory to using it for attracting fish.

A further object of the invention relates to the provision of a plug body having included therein means for concealing barbed members, but which means will permit the immediate protrusion of the barbed members when the plug is "struck" for the engagement by a fish.

Still another object of the invention relates to the provision of an improved manner of setting a lure having concealed hooks in preparing it for further use in the sport of fishing.

A still further object of the invention relates to the provision of improved fish hooking means for a weedless fish lure.

Other objects and advantages of the invention will be apparent during the course of the following description which, taken in connection with the drawing forming a part of this application, discloses a preferred form of my invention. While I have described my invention in its preferred form and embodiment I desire it to be understood that modifications may be made and that no limitations upon the invention are intended other than those imposed by the scope of the appended claims.

In the drawing:

Figure 1 is a plan view of my fish plug with the barb members extending therefrom, Figure 2 is a longitudinal, sectional view taken along the median of the plug of Figure 1, Figure 3 is a view of the plug of Figure 1 as it would appear in the "set" position.

Figures 4, 5, and 6 are cross-sectional views taken along lines 4—4, 5—5, and 6—6, respectively of Figure 2.

Figure 7 is a plan view of the barb member employed in my fishing plug,

Figure 8 is an elevational view of the prong-setting means employed in my fish plug.

Figure 9 is a sectional view of the member of Figure 8, taken along line 9—9 thereof.

Figure 10 is a plan view of the draft link employed in my fish plug,

Figure 11 is a cross-sectional view of the prong-setting means taken on lines 11—11 of Figure 9, and Figure 12 is a fragmentary view of my fish plug with portions shown in section to illustrate conveniently the manner in which the barbed members are retracted within the fish plug in the "set" position.

Referring to the drawing, throughout which like reference characters indicate like parts, the numeral 15 designates a substantially round, slightly tapered plug body having a forwardly extending dowel 16. The body 15 is slotted on either side at 17 and at its rear end has the medial opening 18.

A V-shaped hook member, having divergently urged spring legs 20, 20 extending outwardly from a coil end 21, is provided with the barbs 22 for hooking engagement in a fish. The legs 20 are inserted through the opening 18 at the rear of the plug and passed outwardly through the slots 17, 17 on either side thereof, in the manner shown in Figure 2. A cross pin 23 engages in the coil 21 of the hook member and holds the latter in place within the plug body.

A setting tube 24 provided with a flange 25, has inwardly depressed areas 26 on either side thereof and slots 27 at right angles to the depressed areas 26. By means of the slots 27, through which pass the cross pin 23, the member 24 is longitudinally movable within the plug body in the opening 18 to slidably enclose coil 21 and legs 20, 20. When the tube is moved longitudinally, the depressed areas 26 press upon the legs 20 and tend to bring them toward each other, retracting them in the slots 17 and to thus withdraw them into the body of the lure, as is indicated in Figures 3 and 12. This operation just described is referred to as the "setting" operation for the reason that the hooks are "set" ready to be latched for subsequent release when the device is in use as a fish lure.

On the forward end of the dowel 16 I mount for sliding movement the plug head 30 that has the inner opening 31 to accommodate the dowel. A draft link 32, provided with a forward eye or loop 33, extends rearwardly through the body 30 along the center of the dowel 16 and terminates at its rear end with the elongated loop 34 which is fitted over the pin 23 laterally of the body 15 to permit movement of the body 15 relative to link 32 and the eye 33.

The head 30 is slidable on the pin 32 and in Figure 2 it is shown in the forward position, whereas in Figure 3 it has been slid rearwardly so, as can be seen in Figure 12, the outer tip of the barber members 22 can be engaged in the inner or under face of the annular flange 35 that is formed about the rear end of the head 30.

For the purpose of making this flange 35 strong and capable of resisting the force of the spring legs 20 I mount the metallic ferrule 36 shown in Figures 2 and 12 inside of the flange 35 where it will be retained by its close fit with the head of the plug.

When the extensible barbed prongs are retracted within the body to the "set" position and the head 30 is engaged over them to latch them in place, the plug assumes the form shown in Figure 3. As the plug is drawn forward in fishing, water will enter the slots 17 and flow rearwardly out through the open end 24a of the member 24, where it will produce a visible ripple in the water that seems to enhance the attractiveness of the lure to the fish.

When a fish strikes at the device the member 30 and the member 15 separate and the prongs are released to the position shown in Figure 1 for engagement in the fish. The device is very useful because it is relatively weedless as, when it is cast into a pool having water lilies and the like, it cannot snag because the hooks are not exposed. It takes a strike by a fish to release the hooks from their latched or "set" position.

Having thus described my invention, I claim:

1. A fish plug having a body provided with a forwardly extending dowel, and having a rear passageway communicating with radial slots in the forward portion adjacent the dowel, a coiled eye in said passageway having forwardly and divergently extending barbed spring legs, a lateral pin in said body engaging the eye to maintain said member in fixed position in said passageway, a tubular setting member slidable in said passageway having slots on either side through which said pin passes and adapted to compress said legs upon inward sliding movement, a plug head slidably mounted on the forwardly extending dowel and having means to engage the tip of each said legs when they are retracted, and means for drawing said plug through the water.

2. A fish plug having a body provided with a forwardly extending dowel, and having a rear passageway communicating with radial slots in the forward portion adjacent the dowel, a coiled eye in said passageway having forwardly and divergently extending barbed spring legs, means in said body engaging the eye to maintain said member in fixed position in said passageway, a setting member slidable in said passageway to compress said legs, a plug head slidably mounted on the forwardly extending dowel and having means to engage the tip of each said legs when they are retracted, and means for drawing said plug through the water.

3. A fish plug having a body provided with a forwardly extending dowel, and having a rear passageway communicating with radial slots in the forward portion adjacent the dowel, a coiled eye in said passageway having forwardly and divergently extending barbed spring legs, means in said body engaging the eye to maintain said member in fixed position in said passageway, a setting member slidable in said passageway to compress said legs, a plug head slidably mounted on the forwardly extending dowel, means to engage and retain the tip of each said legs when they are retracted, said means being releasable when the plug is "struck," and means for drawing said plug through the water.

4. A fish plug having a body provided with a forwardly extending dowel, and having a rear passageway communicating with radial slots in the forward portion adjacent the dowel, divergently biased barbed spring legs in said passageway, means in said body engaging the legs to maintain them in fixed position in said passageway, a setting member in said passageway adapted to compress said legs, a plug head slidably mounted on the forwardly extending dowel adapted to engage and retain the tip of said legs when they are retracted, and means for drawing said plug through the water.

ROBERT L. LLEWELLYN.